United States Patent
Do et al.

(10) Patent No.: US 7,178,722 B2
(45) Date of Patent: Feb. 20, 2007

(54) VIRTUAL SHOPPING ENVIRONMENT

(75) Inventors: Phuc Ky Do, Morrisville, NC (US);
Justin Monroe Pierce, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 11/008,690

(22) Filed: Dec. 9, 2004

(65) Prior Publication Data
US 2006/0131401 A1 Jun. 22, 2006

(51) Int. Cl.
*G06K 15/00* (2006.01)

(52) U.S. Cl. .............. 235/378; 235/383; 235/385; 705/20

(58) Field of Classification Search .......... 235/472.02, 235/378; 705/20
See application file for complete search history.

(56) References Cited

U.S. PATENT DOCUMENTS

| | | | |
|---|---|---|---|
| 4,962,466 A | 10/1990 | Revesz et al. | |
| 4,973,952 A | 11/1990 | Malec et al. | |
| 5,250,789 A | 10/1993 | Johnsen | |
| 5,406,271 A | 4/1995 | Sonnendorfer et al. | |
| 6,181,299 B1 | 1/2001 | Frederick et al. | |
| 6,513,015 B2 | 1/2003 | Ogasawara | |
| 6,535,132 B2 | 3/2003 | Waters et al. | |
| 6,641,037 B2* | 11/2003 | Williams | 235/383 |
| 6,876,975 B1* | 4/2005 | Zimmerman et al. | 705/20 |
| 6,975,856 B2* | 12/2005 | Ogasawara | 455/419 |
| 2001/0014868 A1 | 8/2001 | Herz et al. | |
| 2002/0005775 A1 | 1/2002 | Sonnendorfer et al. | |
| 2002/0178085 A1 | 11/2002 | Sorensen | |

* cited by examiner

*Primary Examiner*—Seung Ho Lee
(74) *Attorney, Agent, or Firm*—Duke W. Yee; Mark E. McBurney; Theodore D. Fay, III

(57) ABSTRACT

A shopping environment process includes determining when a shopper is in proximity to an item by detecting a wireless transmission from a shopper device associated with the shopper. A purchase price of the item is determined based in part on the identity of the shopper. A graphical interface of a shelving device associated with the item then displays the purchase price. The interface enables the shopper to purchase the item. The item is then included in a virtual shopping cart associated with the user if the user purchases the item. The shopper device may include a card reader enabling the shopper to associate with the shopper device by swiping a loyalty card. The shelving device can communicate with a customer database server by sending a wireless communication to an intermediate shelving device and transmitting the communication from the intermediate shelving device to a repeater device connected to a wired network.

20 Claims, 4 Drawing Sheets

VIRTUAL SHOPPING ENVIRONMENT

BACKGROUND

1. Field of the Present Invention

The present invention is in the field of electronic systems and, more particularly, electronic systems to facilitate shopping experiences.

2. History of Related Art

Conventional customer shopping processes have several drawbacks and inefficiencies. In a conventional shopping process, a customer wanders through aisles stocked with items for sale. When the shopper wants to purchase an item, the shopper takes the item from a shelf and carries the item or places it in a shopping cart. The shopper eventually completes his or her purchases and brings the entire bundle of items to a checkout counter where the items are then removed from the shopping cart so that they can be scanned electronically or otherwise processed for payment. The items are then placed either into a bag or back into the shopping cart. Although not all shopping environments exhibit all of these characteristics, most exhibit at least some of these traits.

The conventional shopping paradigm requires excessive floor space because inventory is maintained in the shopping area. Inventory shrinkage occurs regularly from a number of sources including theft, breakage, mishandling, and so forth. Checkout lines require too much time due in part to the amount of product handling that takes place. The shopping process is not personal to the individual shopper and the shopper, as a result, does not develop a loyal devotion to the store. It would be desirable to implement a shopping environment that addresses these problems.

SUMMARY OF THE INVENTION

The identified problems are addressed in the present invention by a shopping environment and process that includes determining when a shopper is in proximity to an item by detecting a wireless transmission from a shopper device associated with the shopper. A purchase price of the item is determined based in part on the identity of the shopper. A graphical interface of a shelving device associated with the item then displays the purchase price. The interface enables the shopper to purchase the item. The item is then included in a virtual shopping cart associated with the user if the user purchases the item. The shopper device may include a card reader enabling the shopper to associate with the shopper device by swiping a loyalty card. The shelving device can communicate with a customer database server by sending a wireless communication to an intermediate shelving device and transmitting the communication from the intermediate shelving device to a repeater device connected to a wired network.

BRIEF DESCRIPTION OF THE DRAWINGS

Other objects and advantages of the invention will become apparent upon reading the following detailed description and upon reference to the accompanying drawings in which.

Figure 1:
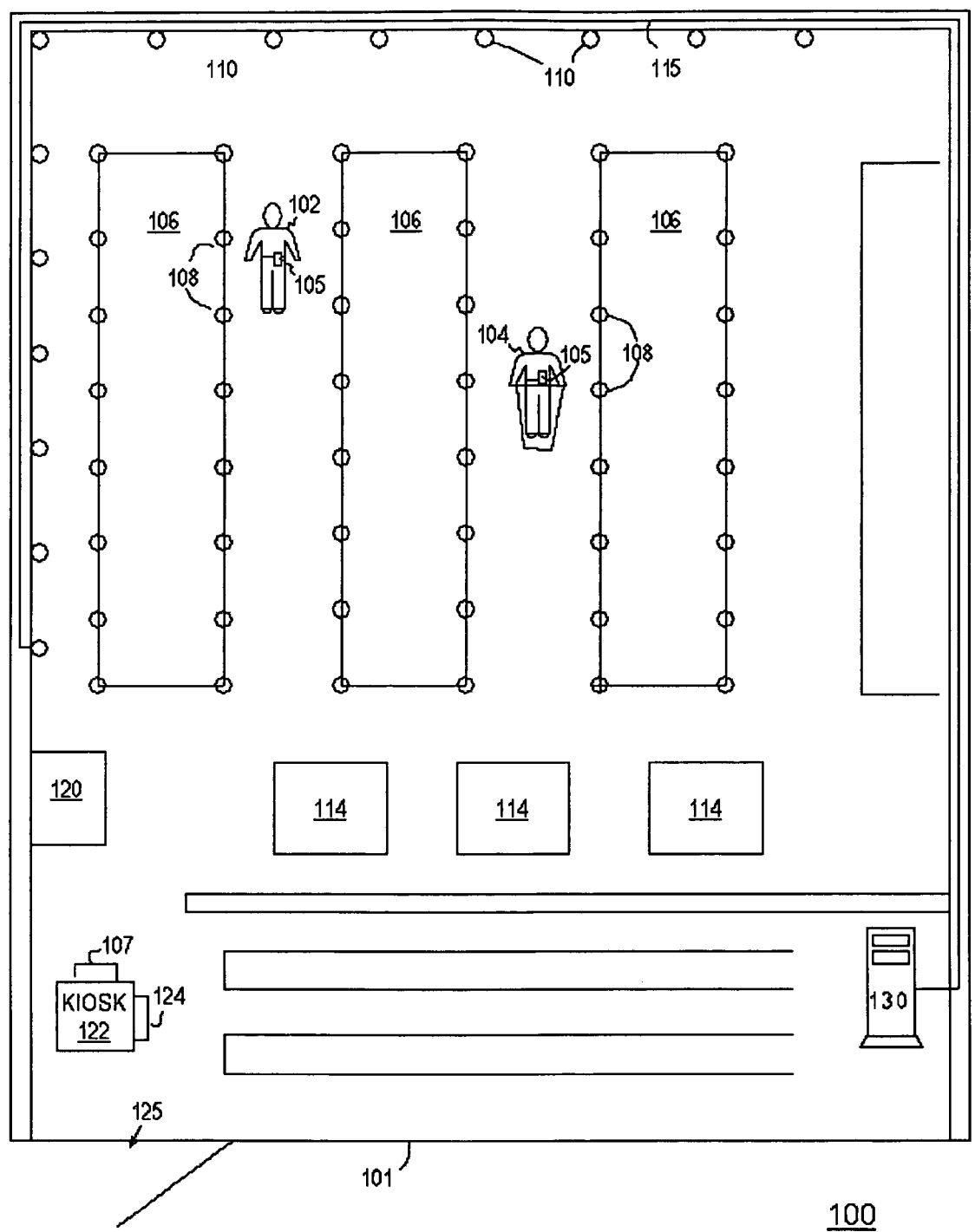
FIG. 1 is a conceptual illustration of a shopping environment according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention encompasses an improved shopping environment and process for consumers. A shopper or consumer is given a transmitting device, referred to herein as a shopper device, upon entering a store and the shopper device is then associated with the shopper. When the shopper and the shopper device are in proximity to an item for purchase, the shopper device sends a signal that is detected by an electronic shelving device associated with the product. The shelving device responds to the signal by displaying price information about the associated product or item. The shelving device, in conjunction with a database server with which the shelving device can communicate, may determine the indicated price based on factors including the identity of the shopper to promote customer loyalty, for example. The user may also have a tablet computing device or pad or the like where the user's virtual shopping cart (the items purchased by the user) are displayed. The tablet device may also display promotional material for items that are in close proximity to the user's current location or promotional material for items that are related to products already purchased by the user. Then when the user has finished shopping, the user's virtual shopping cart may be electronically accessed by a fulfillment server to retrieve the purchased items for the user. In this manner, the purchaser does not take possession of the purchased items until the purchaser has paid for the items and is leaving the store thereby (1) easing the shopper's experience by eliminating the need for large shopping carts to tote around bulky and heavy items (2) reducing shrinkage due to less handling by the customer and (3) improved efficiency at checkout by eliminating the process of removing items from a shopping cart, scanning or otherwise processing the items for payment, receiving payment, and placing the purchased items back in the shopping cart or in a bag.

Turning now to the drawings, FIG. 1 illustrates an exemplary implementation of a shopping environment 100 according to one embodiment of the invention. In the depicted implementation, shopping environment 100 includes a store 101 in which one or more customers 102 and 104 are shopping.

Store 101 includes a set of shelves 106. In the preferred embodiment, shelves 106 display a sample or model of an item for sale, but shelves 106 do not generally carry any stock or inventory of items for sale. All or substantially all of the saleable inventory is stored in a stock portion of store 101 (not depicted in FIG. 1). In this embodiment, shoppers 102 and 104 are not required to carry inventory that they wish to purchase. Instead, shoppers 102 and 104 purchase items "virtually" by electronically adding purchased items to a virtual shopping cart.

The virtual shopping cart is maintained by a database server in the store or accessible to the store and may be accessed when the shopper completes his or her purchases to calculate a bill for the shopping cart items and initiate an automated fulfillment process in which the shopping cart items are retrieved from stock by machine or by store personnel and delivered to the shopper only after the shopper has completed payment and is exiting the store.

In the depicted embodiment of shopping environment 100, electronic purchasing is facilitated by providing each shopper 102 and 104 with a shopper device 105 that is preferably portable and capable of being affixed to the shopper or the shopper's clothing (such as the depicted shopper devices 105) and by providing a plurality of electronic price tags referred to herein as electronic shelving devices 108. The shopper device 105 is a means by which the shopper acquires an electronically transmittable identity within the store so that, for example, one shopper's purchases may be differentiated from another's. Shopper device 105 also provides a wireless mechanism for indicating the location or position of shoppers 102 and 104 within store 101.

Each shelving device 108 is located on shelves 106 adjacent or in proximity to a corresponding item for sale. Shelving devices 108 may be connected to a source of AC or DC power within shelves 106. Alternatively, shelving devices 108 may include an internal power source such as a battery. Shelving devices 108 are configured to display a purchase price of the corresponding item for sale to a shopper 102 or 104.

In the preferred embodiment, shopper devices 105 and shelving devices 108 operate in conjunction with one another. In the preferred embodiment, shopper device 105 includes a wireless transmitter and shelving devices 108 include a wireless receiver or transceiver. The shopper device transmitter preferably has a limited range of operation. When a shopper device 105 is within close proximity to a shelving device 108, the shelving device receiver or transceiver detects a signal from the shopper device 105. The shopper device signal serves two purposes, namely, to inform the nearby shelving devices that a shopper is in proximity and to identify the shopper to the shelving devices. The shelving devices 108 are configured to respond to detecting a shopper device signal by displaying a purchase price and perhaps other information. The purchase price displayed by a shelving device 108 may be determined based at least in part on the identity of the shopper.

The depicted embodiment of store 101 also includes a set of manual checkout stands 114, an automated checkout stand 120, and a kiosk 122 positioned near an entrance 125 of store 101. Kiosk 122 may include a card reader (124) for reading a shopper's loyalty card. Alternatively, kiosk 122 may include another mechanism by which shoppers may identify themselves to a shopping device 105, which is described below with respect to FIG. 2 and FIG. 3. In addition, a set of repeaters 110 are shown as positioned along walls of store 101 and a wired network 115 is shown as being routed through the store walls to a server system indicated by reference numeral 130. Server system 130 may provide various server applications, such as inventory database, a customer database, and an order fulfill server to store 101.

Figure 2:
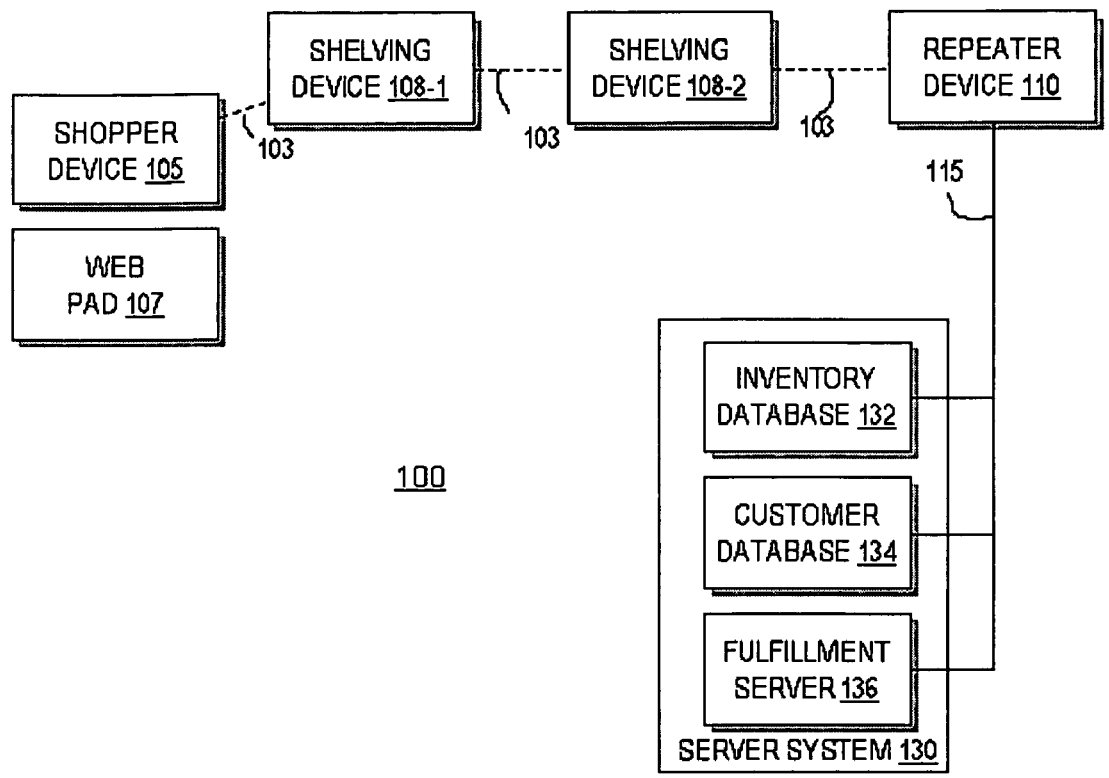
FIG. 2 is a block diagram of selected elements of the shopping environment of FIG. 1.

Referring now to FIG. 2, a block diagram of selected elements of shopping environment 100 according to one embodiment of the present invention is shown. In the depicted embodiment, shopping environment 100 includes a shopper device 105 in wireless communication (reference numeral 103) with a shelving device 108. In the preferred implementation, wireless communication between a shopper device 105 and a shelving device 108 is active only when the shopper device is in close proximity to the shelving device 108. For purposes of this disclosure, close proximity refers to a distance of less than approximately 10 feet.

Shelving devices 108 are connected to one or more servers or databases. In the depicted embodiment, a first shelving device 108-1 is in wireless communication with one or more intermediate shelving devices 108-2 and one or more repeaters 110. Thus, shelving devices 108 as depicted in FIG. 2 provide a wireless network connecting each shelving device with its neighbor(s) through a wireless communication protocol. Repeater 110 is connected to a wired network 115. Wired network 115 connects repeaters 110 to one or more server systems. In an alternative embodiment (not depicted), shelving devices 108 may be wired directly to wired network 115.

In the depicted configuration, wired network 115 connects to a server system 130 that includes an inventory database 132, a customer database 134, and a fulfillment server 136. Server 130 may include all of the inventory, customer, and order fulfillment functionality suggested by FIG. 2. Alternatively, separate server systems may be used to provide one or more of the functions indicated in FIG. 2.

Figure 3:
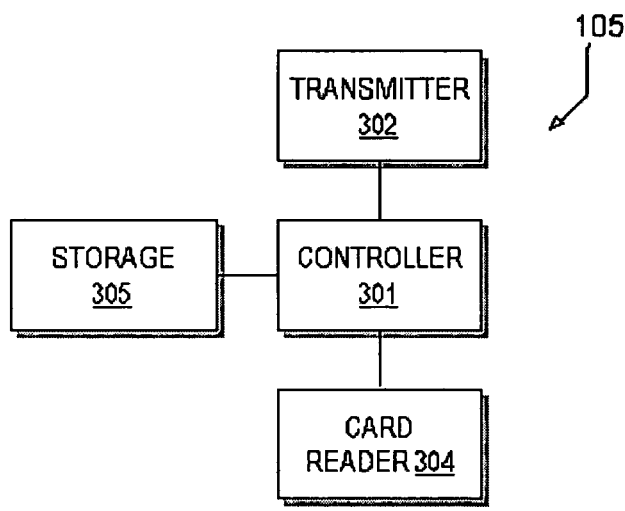
FIG. 3 is a block diagram of selected elements of a shopper device of FIG. 2.

Referring now to FIG. 3, a block diagram of selected elements of a shopper device 105 according to one embodiment is shown. Functionally, shopper device 105 is able to transmit a unique identifier for the shopper to whom the shopper device is provided. Shopper device 105 is preferably a small, portable, and lightweight device that may be carried by a shopper in a non-intrusive manner. In one embodiment, for example, shopper device 105 is attached to an article of the shopper's clothing or otherwise attached to the shopper's person so that the shopper device closely tracks the shopper's physical location within the store without impeding or hindering the shopper's freedom of movement.

As depicted in FIG. 3, shopper device 105 includes a controller 301 that is connected to a wireless transmitter 302 and storage indicated by reference numeral 305. Storage 305 may include non volatile storage elements such as a flash memory card as well as a volatile "scratch" memory. Shopper device 105 as depicted in FIG. 3 further includes an input device in the form of a card reader 304.

Card reader 304 includes means for reading information from a magnetic strip such as the magnetic strip that may be located on the back of a shopper's loyalty card. In this implementation, a shopper is provided with a shopper device 105 upon entering the store 101. If the shopper has a loyalty card, the user may swipe the loyalty card through card reader 304 and thereby identify the shopper to the shopper device 105. Other embodiments of shopper device 105 may omit card reader 304. In these embodiments, shoppers may identify themselves to shopping device 105 through other means. For example, shoppers might identify themselves by entering their phone number (or another unique alphanumeric sequence) or swiping a loyalty card at a centralized location such as kiosk 122 (FIG. 1). Kiosk 122, in this case, would include a transceiver mechanism to transmit the shopper's identity to the shopper device 105.

Shopper device 105 is configured to broadcast a wireless signal using wireless transmitter 302. The wireless signal includes information identifying the corresponding shopper. If the shopper has a loyalty card (or other identifying means such as a credit card, for example), the wireless signal identifying information will uniquely identify the shopper to the shopping environment 100. In cases where a shopper does not have a loyalty card or other identifying means that the shopper wishes to use, the shopper device 105 may simply identify the shopper with a unique number.

In one embodiment, Bluetooth or another suitable limited range wireless protocol is used as the wireless transmission mechanism that permits shopper device 105 and shelving device 108 to communicate with one another. Bluetooth advantageously offers a wireless transmission protocol with an inherently limited range. Moreover, the actual range of a Bluetooth compliant transmitter can be modified to accommodate a particular application. With respect to shopping environment 100, for example, it may be desirable or necessary to limit the transmission range of shopper devices 105 to 10 feet or less. The wireless infrastructure described for shopper device 105 and shelving devices 108 beneficially provides two distinct functions with a single wireless infrastructure. In addition to enabling shopper devices and shelving devices to communicate wirelessly, the limited transmission range of the wireless infrastructure provides a proximity or location indicating functionality that permits the store to determine, with good precision, where a shopper is located. It will be appreciated, however, that although Bluetooth offers one possible solution for the wireless protocol, other wireless protocols may also be used.

Once shopper device 105 is associated with a particular shopper, one embodiment of shopper device 105 simply transmits the shopper identifying signal continuously with a signal power adjusted to achieve the desired range of transmission. As a shopper 102 or 104 moves about the shopping environment, the shopper device 105 continues to transmit the shopper identifying signal thereby effectively indicating the position of the shopper within a radius determined by the range of the identifying signal.

Figures 4, 7:
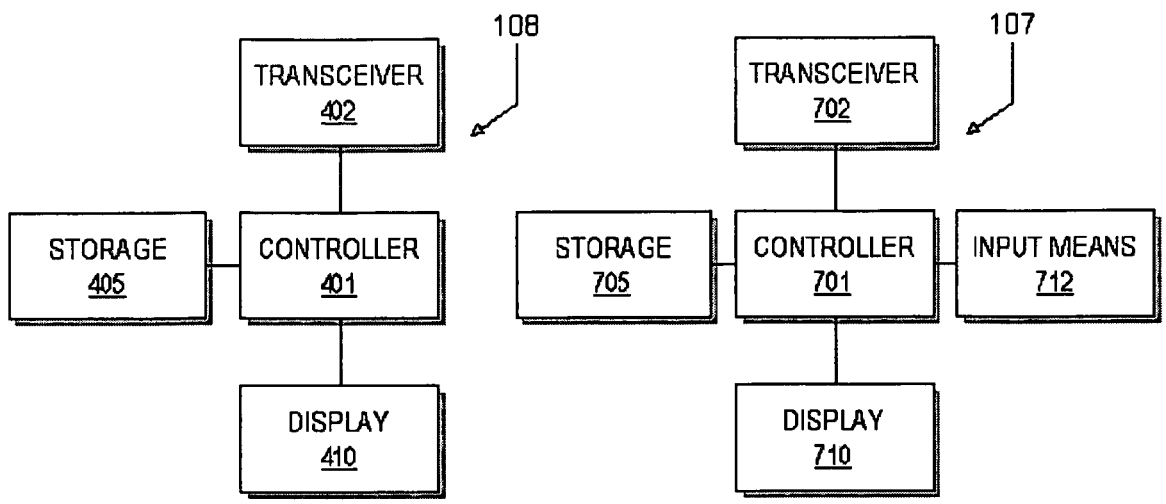
FIG. 4 is a block diagram of selected elements of a shelving device of FIG. 2.
FIG. 7 is a block diagram of selected elements of a tablet device for use with the present invention.

The shelving devices 108, meanwhile, are preferably maintained in a receiving mode that enables them to detect the presence of an identifying signal from a shopper device 105 when the shopper device 105 is in close proximity. Referring to FIG. 4, selected elements of a shelving device 108 according to one embodiment of the invention are shown. In the depicted embodiment, shelving device 108 includes a controller 401 connected to a wireless transceiver 402, a storage element 405, and a display unit 410. Storage element 405 preferably includes programmable nonvolatile memory elements such as a flash memory device as well as volatile scratch memory for controller 401.

The transceiver 402 is configured to detect the presence of a wireless signal transmitted by a shopper device 105. When transceiver 402 detects such a signal, the controller 401 is configured to extract the identifying information from the signal and transmit the identifying information to one of the shopping environment servers or databases. As shown in FIG. 2, a shelving device 108 can transmit information to an adjacent shelving device 108 that acts as a conduit and repeater station for the wireless network. By arranging a network of closely spaced shelving devices 108, the limited range wireless protocol that is desirable for the shopper devices 105 does not present a significant problem for the shelving devices 108. In other words, despite the limited range wireless protocol, the shelving devices 108 are able to communicate information until a wired network 115 is contacted.

When a shelving device 108 detects a signal from a shopper device 105, the shelving device "associates" with the shopper device 105. The shelving device then communicates the identity of the shopper (if known) to a customer database 134 (FIG. 2). The customer database 134 may include information such as the frequency with which the corresponding shopper visits the shopping environment 100 and the purchasing history of the shopper.

The shelving device 108 with which a shopper device is associated corresponds to an item for sale. The shelving device 108 may, for example, be positioned adjacent to a model or sample of the item for sale. When the shelving device 108 associates with a shopper device 105 and communicates the identity of the shopper to customer database 134, the customer database may use the purchasing history of the shopper to perform one of at least two actions. First, the purchasing history of a shopper may be used to determine the purchase price of the item for sale that will be offered to the shopper. In this case, the purchasing history of the shopper may be used to determine the level of discount that the shopper is eligible for.

In addition, the purchasing history of the shopper together with preference information that may be stored in customer database 134, may be used to predict other items for sale that may be of interest to the shopper. Based on such predictions, the customer database, in conjunction with an inventory database 132, may provide promotional information to the shopper. As an example, customer database 134 may indicate that the last time this shopper purchased Item "A", the shopper also purchased Item "B". In this case, the customer database 134 may prompt the shopper regarding a discount on Item "B" when the shopper device 105 associated with a shelving device for Item "A" and, perhaps more specifically, when the shopper actually purchases Item A. In another example, when a shopper device associates with a shelving device corresponding to a particular product, the inventory database 132, which may include information concerning the relative positions of shelving devices 108 within shopping environment 100, may produce a promotional message for items that are in proximity to the shopper's current location within the store.

To convey these promotional messages, one implementation of the invention provides the shopper with an optional web pad or tablet device (indicated by reference numeral 107 in FIG. 2). Tablet devices, for example, may be affixed to shopping carts within shopping environment 100. Referring back to FIG. 1, for example, a first shopper 102 is shopping without the aid of a shopping cart and may not have a tablet 107 whereas a second shopper 104 who does have a shopping cart may have a tablet device 107 that is located on the shopping cart.

Referring to FIG. 7, a suitable tablet device 107 is shown. Like the shelving device 108 depicted in FIG. 4, tablet device 107 includes a controller 701 connected to a wireless transceiver 702, storage 705, and a display 710. The display 710 for tablet device 107 is preferably larger and more capable than the display device 410 for shelving device 108. Tablet device 107 also includes inputs means 712 (e.g., a keyboard, pointing device, stylus, or the like). Input means 712 may be implemented in hardware or software (e.g., a graphical interface), or a combination of both. In addition to displaying promotional messages, tablet device 107 is preferably enabled to display the contents of the shopper's cart (i.e., the items purchased by the shopper). Tablet devices 107 may also be enabled to permit users to edit the contents of their shopping carts.

For shoppers that do not have tablet devices 107, kiosk 122 may include a tablet device 107 (see FIG. 1) or the functional equivalent thereof. In this embodiment, a shopper who does not have a tablet device 107 (e.g., shopper 102) may approach kiosk 122 and view his or her shopping cart via the kiosk's tablet device 107. Moreover, the kiosk tablet device 107 may enable the shopper to print documents such as the shopping cart or a receipt.

Figure 5:
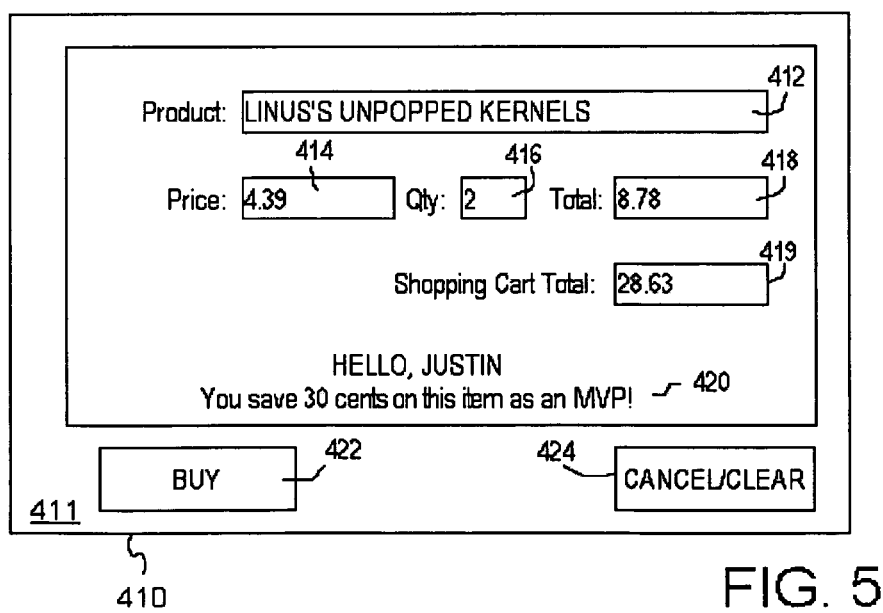
FIG. 5 is an exemplary interface displayed by the shelving device of FIG. 4 according to one embodiment of the present invention.

Returning now to the operation of shelving devices 108, shelving devices 108 are preferably configured to display via display device 410 a graphical interface to a shopper in possession of a shopper device 105 that has associated with a shelving device 108. An exemplary interface 411 is depicted in FIG. 5. In the depicted implementation, interface 411 includes various fields that convey information to the shopper with whom the shelving device is currently associated. The depicted interface 411, for example, includes a product field 412 where a description of the item with which shelving device 108 is associated is displayed. In addition, interface 411 includes an interface button 422 enabling the shopper to purchase the product described in field 412 and a cancel/clear button 424 enabling the shopper to cancel a purchase of the item.

A purchase price field 414 displays the purchase price (including any shopper specific discounts) that is applicable to the current shopper. A quantity field 416 informs the shopper of how many of the items are currently stored in the shopper's electronic or virtual shopping cart. Shelving device 108 must retrieve this value from the customer database server 134 when the shopper associates with an item. A zero value in quantity field 416 informs the shopper that he or she has not purchased any of these items in the current shopping trip. This feature beneficially eliminates the need to maintain or mark off a shopping list. A shopper can tell simply by referring to quantity field 416 whether he or she has already purchased the corresponding item.

Shelving device interface 411 as shown further includes an item total field 418 indicating the product of the purchase price in field 414 and the quantity in field 416. The depicted implementation of interface 411 further includes a shopping cart total field 419 that displays the total of all items purchased by the shopper. Interface 411 as depicted in FIG. 4 also displays a personalized message 420 where the message is indicative of the shopper's identity and informs the shopper of any discounts that the shopper is receiving on a particular item. This personalized field 420 is generated based on the identification of the user provided by shopper device 105 together with any applicable discount determined by the customer database 134 in conjunction with inventory database 132.

Significant portions of the present invention may be implemented as a set or sequence of computer executable instructions (computer software), stored on a computer readable medium, for providing a shopping environment according to the present invention. In these embodiments, the instructions may be stored in the storage of the shopper device 105, the shelving device 108, or any of the servers 132, 134, and 136.

Figure 6:
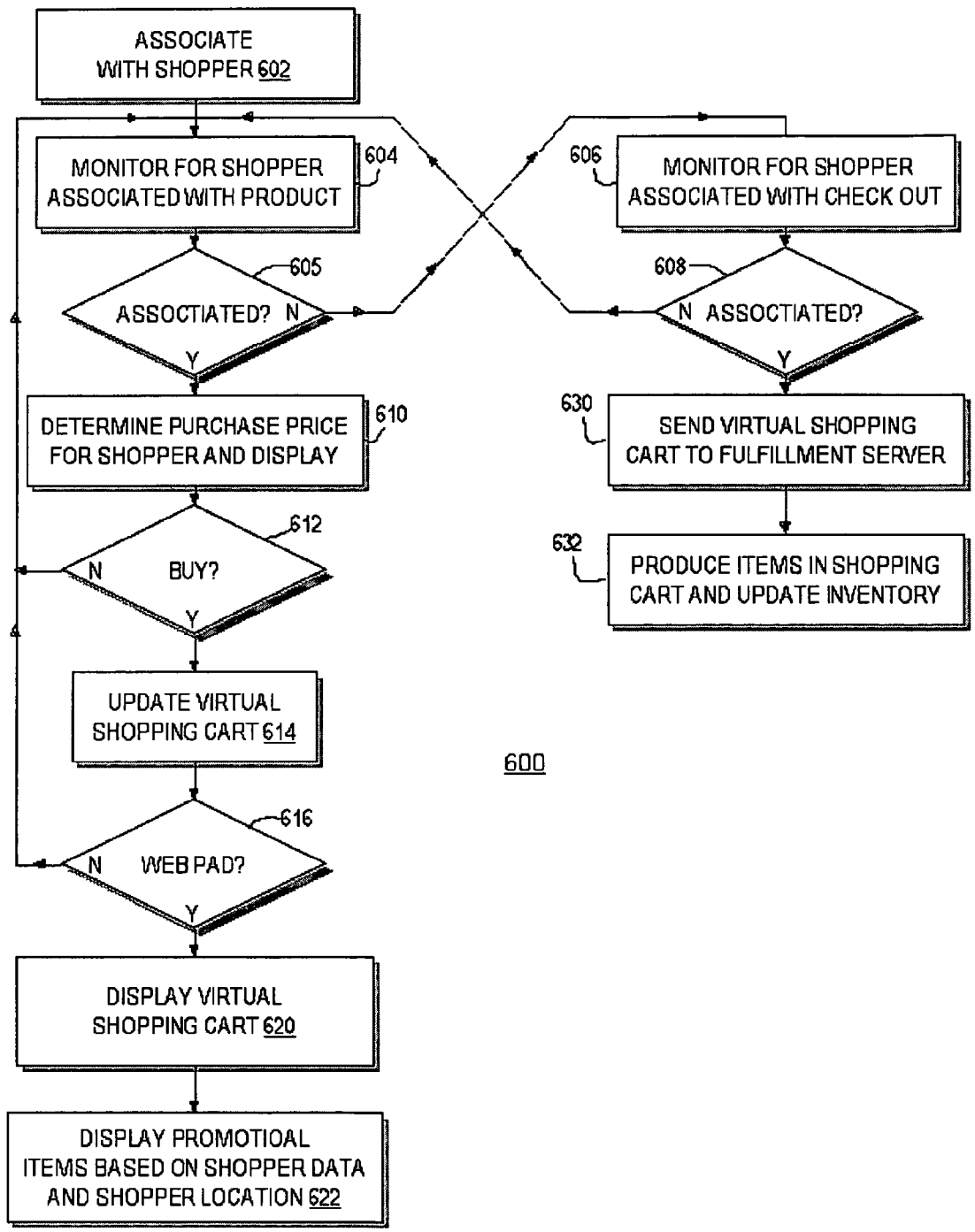
FIG. 6 is a flow diagram illustrating a method and computer code for providing a shopping experience according to one embodiment of the present invention.

Referring now to FIG. 6, a flow diagram of a method or computer code for providing a shopping environment according to one embodiment of the present invention is depicted. In the depicted embodiment, method 600 includes associating (block 602) a shopper device with a shopper. As described above, this association is preferably performed when the shopper enters the store and is provided with a shopper device. The association between the shopper and the shopper device may be personal, such as when the shopper has a loyalty card that is swiped through a card reader on the shopper device or on a kiosk within the store, or generic such as when the shopper does not have a loyalty card, but the association between the shopper and the shopper device is unique.

Method 600 as depicted in FIG. 6 encompasses activity by shopper devices, shelving devices, and check out devices. The left side of FIG. 6 includes activity involving shopper devices and the shelving devices while the right side of FIG. 6 includes activity involving shopper devices and check out devices. The various activities are depicted in one flow diagram to convey the concept that the shopping environment provided by method 600 encompasses divergent devices.

After a shopper has associated with a shopper device and begins to move around the shopping environment, shelving devices monitor (block 604) for an association with a shopper device. If (block 605) the shopper moves within a specific range of a shelving device, the shelving device will detect a wireless signal from the shopper device and associate with that device. The shopper device signal indicates the identity of the shopper (either personally or through a unique "serial" number for anonymous shoppers). The shelving device is proximal to an item or product for sale.

When a shelving device associates with a shopper device, the shelving device transmits the identity of the shopper to the customer database to determine (block 610) a purchase price for the item or product for sale. The purchase price is preferably specific to the corresponding shopper and is preferably determined by retrieving a basic unit price for the item from an inventory database 132 (or from nonvolatile storage in the shelving device itself) and applying any discount applicable. The applicable discount may include a loyalty discount specific to the shopper based at least in part on the purchasing history of the shopper. The determined purchase price is then sent back to the shelving device and displayed by the shelving device.

The shelving device preferably displays the determined purchase price with an interface (such as interface 411 of FIG. 5) that includes means for enabling the shopper to purchase the item. The shelving device, while it is associated with a shopper and displaying a purchase price for that shopper, monitors (block 612) to determine if the shopper purchases the item. If the shopper purchases the item through graphical interface 411, the purchase decision is conveyed by the shelving device to the customer database server 134, which maintains the active shopping cart lists, and the shopper's virtual shopping cart is updated (block 614) to include the purchased item. The purchase transaction may also be conveyed to the inventory database server 132 to update the available inventory to reflect the purchase of the item by the shopper.

If the shopper has a tablet or web pad device (as determined in block 616) the shelving device may also retrieve the updated virtual shopping cart from the customer database server 134 and display (block 620) the updated shopping cart list on the tablet device. In addition, promotional and/or informational messages may be displayed (block 622) to a shopper in possession of a tablet device. The promotional messages may refer to other items for sale that may be of interest to the shopper.

In one implementation, the promotional messages are primarily directed at items that are in proximity to the shopper's current location. Because of the limited range of the wireless infrastructure, the association between a shopper device 105 and a shelving device 108 conveys the position of the shopper as being in close proximity to the corresponding shelving device. Using information stored in inventory database server 132, one embodiment of the invention determines which items are close the shopper's current location and generates one or more promotional messages for those items. In another implementation, promotional items may be primarily directed to items that the shopper has purchased during previous shopping instances. Historical shopping information relevant to a particular shopper may be stored in customer database server 134. After displaying the virtual shopping cart and any promotional messages, method 600 returns to monitoring the shopper for an association with another shelving device.

In addition to monitoring for an association between a shopper device and a shelving device in block 605, the depicted embodiment of method 600 includes monitoring (block 606) for an association between a shopper device and a check out stand such as the conventional check out stands 114 or the automated checkout stand 120 shown in FIG. 1. Blocks 604, 605, 606, and 608 are intended to convey the concept that the shopping environment provided by method 600 includes the shelving devices and the check out stands continuously and concurrently monitoring for an association with a shopper device.

If a shopper device associates (block 608) with either type of check out stand, such as when the shopper passes within close range of the automated checkout stand 120, the checkout stand 120 or 114 causes the virtual shopping cart in the customer database server to be transmitted (block 630) to a fulfillment server 136. The fulfillment server 136 may then initiate the process of retrieving (block 632) the purchased items for the shopper and providing the purchase item bundle to the shopper as the shopper exits the store.

It will be apparent to those skilled in the art having the benefit of this disclosure that the present invention contemplates a virtual shopping environment. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method for enabling a shopper to purchase items, comprising:
   determining when the shopper is in proximity to an item by detecting a wireless transmission from a shopper device associated with the shopper;
   determining a purchase price of the item based, at least in part, on the identity of the shopper;
   displaying a graphical interface on a shelving device associated with the item, wherein the graphical interface includes the purchase price of the item and further wherein the graphical interface enables the shopper to purchase the item; and
   responsive to the shopper using the graphical interface to purchase the item, including the item in a virtual shopping cart associated with the user.

2. The method of claim 1, wherein determining the purchase price of the item comprises:
   transmitting the identity of the shopper to a customer database server;
   retrieving the unit price of the item from an inventory server;
   determining a discount applicable to the shopper;
   calculating the purchase price for the shopper from the unit price and the applicable discount.

3. The method of claim 1, wherein the interface further displays a personalized message to the shopper.

4. The method of claim 1, wherein associating the shopper device with the shopper includes swiping a card having information identifying the shopper on a card reader of the shopper device.

5. The method of claim 1, wherein a strength of the shopper device wireless signal is limited to less than approximately 10 feet.

6. The method of claim 1, wherein the shelving device is configured to communicate with a customer database server by sending a wireless communication to an intermediate shelving device and transmitting the communication from the intermediate shelving device to a repeater device connected to a wired network to which the customer database is connected.

7. The method of claim 1, further comprising, responsive to determining that the shopper is in proximity to an item, providing the shopper with a promotional message regarding a second item.

8. The method of claim 7, wherein the second item comprises an item that is in proximity to the shopper's current location.

9. The method of claim 7, wherein the second item comprises an item predicted to be of interest to the shopper based on historical shopping data of the shopper.

10. A shopping environment, comprising:
    a shopper device associated with a shopper, wherein the shopper device is configured to transmit a wireless signal identifying the shopper;
    a shelving device associated with an item for sale, wherein the shelving device is configured to detect the wireless shopper device signal; and
    wherein the shelving device is configured to respond to detecting the wireless device by displaying a shopper interface indicating the purchase price of the item to the shopper and enabling the shopper to purchase the item.

11. The shopping environment of claim 10, wherein the purchase price is determined based in part on the identity of the shopper.

12. The shopping environment of claim 10, wherein the shelving device is configured to transmit the shopper's identity to a customer database server having purchasing history information for the shopper and wherein the customer database is configured to determine a discount applicable to the shopper based on the purchasing history information.

13. The shopping environment of claim 12, wherein the shelving device is configured to transmit a wireless signal indicating the shopper's identity and wherein the customer database server is configured to receive a signal indicating that shopper's identity through a wired network and wherein the shopping environment further includes means for conveying the wireless signal from the shelving device to the wired network of the customer database server.

14. The shopping environment of claim 10, wherein, responsive to the shopper using the interface to purchase the item, adding the item to a virtual shopping cart of the shopper.

15. The shopping environment of claim 14, further comprising, responsive to the shopper completing purchases of desired items, invoking a fulfillment server to access the virtual shopping cart and retrieve the items in the shopping cart.

16. The shopping environment of claim 10, wherein the fulfillment server, in addition to retrieving the shopping cart items, generates a total price for the shopping cart items and debits an account associated with the shopper with the total price.

17. A computer program product, stored on a computer readable medium on a computing device capable of executing computer code, for providing a shopping experience, comprising:

computer code means for detecting the presence of a shopper in proximity to an item for sale;

computer code means for determining, based in part on an identity of the shopper, a purchase price associated with the unit for sale;

computer code means for displaying a graphical interface indicating the determined purchase price and enabling the user to purchase the item;

wherein said computer code means are executable by a shelving device.

18. The computer program product of claim 17, further comprising, computer code means for displaying a promotional message to the user responsive to detecting the presence of the shopper in proximity to the item for sale.

19. The computer program product of claim 18, wherein the promotional message promotes a second item for sale wherein the second item for sale is in proximity to the shopper.

20. The computer program product of claim 19, wherein the computer code means for detecting the presence of the shopper in proximity to the item for sale includes computer code means for associating a wireless shopper device provided to the shopper with a wireless receiving shelving device associated with the item for sale and wherein the computer code means for determining the purchase price includes computer code means for sending the identity of the shopper from the shelving device to a customer database server, wherein the database server includes computer code means for determining a discount applicable to the shopper based on a purchasing history of the shopper.

\* \* \* \* \*